United States Patent
Strohacker

(10) Patent No.: US 6,320,986 B1
(45) Date of Patent: Nov. 20, 2001

(54) PREPROCESSING MULTIPLE BIT PER PIXEL SAMPLED DATA FOR LEMPEL-ZIV COMPRESSION

(75) Inventor: Oscar Conrad Strohacker, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 08/516,773

(22) Filed: Aug. 18, 1995

(51) Int. Cl.$^7$ ................................. G06K 9/36; G06K 9/46
(52) U.S. Cl. ............................................ 382/239; 382/244
(58) Field of Search ..................................... 382/239, 244, 382/246, 166; 341/51; 358/261.2, 426, 430; 345/187, 202, 550, 555; 348/393; 364/724.1; 708/313

(56) References Cited

U.S. PATENT DOCUMENTS

| | | | |
|---|---|---|---|
| 4,409,623 | 10/1983 | Kobayashi et al. | 358/261 |
| 4,598,411 | * 7/1986 | Berkovich et al. | 358/426 |
| 4,707,729 | * 11/1987 | Bruno et al. | 348/396 |
| 4,712,140 | 12/1987 | Mintzer et al. | 358/260 |
| 5,058,187 | 10/1991 | Kim | 382/56 |
| 5,140,417 | * 8/1992 | Tanaka et al. | 382/250 |
| 5,164,819 | 11/1992 | Music | 358/13 |
| 5,170,368 | * 12/1992 | Hattori | 364/724.1 |
| 5,300,949 | * 4/1994 | Rodriquez et al. | 345/202 |
| 5,361,147 | * 11/1994 | Katayama et al. | 358/532 |
| 5,369,605 | 11/1994 | Parks | 364/715.09 |
| 5,379,351 | * 1/1995 | Fandrianto et al. | 382/236 |
| 5,384,646 | * 1/1995 | Godshalk et al. | 358/426 |
| 5,416,857 | 5/1995 | Chen et al. | 382/237 |
| 5,463,699 | * 10/1995 | Wilkinson | 382/246 |
| 5,526,472 | * 6/1996 | Strohacker | 395/133 |
| 5,532,694 | * 7/1996 | Mayers et al. | 341/67 |

OTHER PUBLICATIONS

Tavakoli, Lossless compression of medical images, May 1991, pp. 200–207, IEEE.*
IBM Technical Disclosure Bulletin, vol. 24, No. 9, Feb. 1982, "High Performance Exact Gray–Scale Compression Technique", pp. 4513–4516.
A Universal Algorithm for Sequential Data Compression, IEEE Transactions on Information Theory, vol. IT–23, No. 3, May 1977, pp. 337–343, Ziv et al.

* cited by examiner

Primary Examiner—Timothy M. Johnson
(74) Attorney, Agent, or Firm—Casimer K. Salys

(57) ABSTRACT

A preprocessor for processing sample data, particularly digital video data, to improve lossless sliding window type Lempel-Ziv compression of the data. Sliding window Lempel-Ziv compression is improved by transposing the multiple bit per pixel data samples before compression so that the relatively repetitive higher order bits of successive pixels are compressed separately from the relatively volatile lower order bits of the successive pixels. The transposition is particularly suited for bit plane configured frame buffers in that compression and decompression grouping is readily performed by the manipulation of data within the individual bit planes.

10 Claims, 9 Drawing Sheets

Example 1:

Bit transposition of a block of 8 8-bit pixels:

| originally: | 96 | 90 | 97 | 9c | 9c | 8d | 8b | 89 | | |
|---|---|---|---|---|---|---|---|---|---|---|
| bit matrix: | | | | | | | | | | |
| bitplane 7 | 1 | 1 | 1 | 1 | 1 | 1 | 1 | 1 | - | ff |
| 6 | 0 | 0 | 0 | 0 | 0 | 0 | 0 | 0 | - | 00 |
| 5 | 0 | 0 | 0 | 0 | 0 | 0 | 0 | 0 | - | 00 |
| 4 | 1 | 1 | 1 | 1 | 1 | 0 | 0 | 0 | - | f8 |
| 3 | 0 | 0 | 0 | 1 | 1 | 1 | 1 | 1 | - | 1f |
| 2 | 1 | 0 | 1 | 1 | 1 | 1 | 0 | 0 | - | bc |
| 1 | 1 | 0 | 1 | 0 | 0 | 0 | 1 | 0 | - | a2 |
| 0 | 0 | 0 | 1 | 0 | 0 | 1 | 1 | 1 | ↔ | 27 | transposed: ff 00 00 f8 1f bc a2 27

Example 2:

Bit transposition of a block of 16 8-bit pixels:

| pixel value | 96 | 90 | 97 | 9c | 9c | 8d | 8b | 89 | 92 | 99 | 9a | 95 | 99 | 99 | 98 | 90 | | |
|---|---|---|---|---|---|---|---|---|---|---|---|---|---|---|---|---|---|---|
| bit matrix: bitplane | | | | | | | | | | | | | | | | | | |
| 7 | 1 | 1 | 1 | 1 | 1 | 1 | 1 | 1 | 1 | 1 | 1 | 1 | 1 | 1 | 1 | 1 | . | ff |
| 6 | 0 | 0 | 0 | 0 | 0 | 0 | 0 | 0 | 0 | 0 | 0 | 0 | 0 | 0 | 0 | 0 | . | 00 |
| 5 | 0 | 0 | 0 | 0 | 0 | 0 | 0 | 0 | 0 | 0 | 0 | 0 | 0 | 0 | 0 | 0 | . | 00 |
| 4 | 1 | 1 | 1 | 1 | 1 | 0 | 0 | 0 | 1 | 1 | 1 | 1 | 1 | 1 | 1 | 1 | . | f8 |
| 3 | 0 | 0 | 0 | 1 | 1 | 1 | 1 | 1 | 0 | 1 | 1 | 0 | 1 | 1 | 1 | 0 | . | 1f |
| 2 | 1 | 0 | 1 | 1 | 1 | 1 | 0 | 0 | 0 | 0 | 0 | 1 | 0 | 0 | 0 | 0 | . | bc |
| 1 | 1 | 0 | 1 | 0 | 0 | 0 | 1 | 0 | 1 | 0 | 1 | 0 | 1 | 0 | 0 | 0 | . | a2 |
| 0 | 0 | 0 | 1 | 0 | 0 | 1 | 1 | 1 | 0 | 1 | 0 | 1 | 1 | 1 | 0 | 0 | . | 27 | transposed: ff ff 00 00 00 f8 1f 6e bc 10 a2 a0 27 5c

Example 3: top line of Voyager Ganymede 128x128 image bit-transposed as a block of 128 8-bit pixels.

Original block of 128 8-bit pixels

```
0f 0e 0f 0f 0f 0f 0f 0f 0f 10 0f 0f 0e 0e 0e 0e
0e 0e 0f 0e 0e 0e 0e 0e 0e 0f 0f 0e 0e 0e 0d 0f
0e 0e 0e 0d 0d 0d 0e 0e 0e 0e 0e 0d 0e 0d 0d 0e
0d 0c 0e 0e 0e 0c 0d 0d 0d 0e 0e 0d 0d 0e 0e 0c
0d 0d 0d 0d 0e 0d 0d 0e 0e 0e 0d 0e 0e 0e 0d 0e
0f 0e 0e 0f 0e 0e 0f 0e 10 10 11 10 0f 2a 7b 9e
9a 96 98 87 8f 9f a6 b3 bd bc c5 ca cb d2 c0 ac
bb d0 da dd d3 c3 a7 8d 71 6c 6e 68 66 62 71 89
```

Transposed block of 128 data bytes

```
00 00 00 00 00 00 00 00 00 00 01 00 ff ff 01 ← slowly varying data from bit plane 7
00 00 00 00 00 00 00 00 00 02 00 3e 7c fe
00 00 00 00 00 00 00 00 01 02 06 03 c1 82 fe
00 80 00 00 00 00 00 00 ff ff 00 06 e5 c4 f8 82
ff 7f ff ff ff ff ff ff ff ff ff 0f ac d9 b1 71
ff 7f ff eb c5 fb 35 84 14 7d 09 5e e1 13 68
ff 7f 22 d5 3a 04 88 7a eb 82 92 ff df 1c ae 2c
bf 66 22 d5 3a 04 88 7a eb 82 92 2a 1d a8 9f 83 ← rapidly varying data from bit plane 0
```

FIG. 9

Example 4: middle line of Voyager Ganymede 128x128 image bit-transposed as a block of 128 8-bit pixels.

Original block of 128 8-bit pixels:

```
0d 0d 0d 0c 0d 0d 0e 0e 0d 0d 0f 0e 0d 0d 0e 0f
0e 10 0e 0f 0f 0f 0f 10 0f 10 2c 7d ad ca d0 69
ca ba a2 91 7f 74 7e 87 8f 92 82 79 74 6e 65 68
70 7a 78 71 75 7f 88 7c 6c 6d 89 7c 6f 65 9e 9e
72 7e 84 87 88 85 82 7d 7a 7d 84 97 9d a2 98 90
96 90 97 9c 8d 8b 8b 89 92 99 9a 95 99 99 98 7b
93 92 8b 8f 95 93 97 96 98 96 92 8d 88 85 88 65
78 7f 7d 7e 7d 6b 71 81 7f 77 6d 6a 6d 6c 6c 65
```

Transposed block of 128 data bytes:

```
00 00 00 07 f1 f0 02 00 3e 3f ff ff fe 01 00    ← from bit plane 7
00 00 00 0b 8e 0f fd ff c0 c0 00 00 01 fe ff          6
00 00 00 1c 6e 0f fd ff c1 c4 00 00 01 fe ff          5
00 00 41 69 5e 4c fd 38 c1 db ff cf e1 fa c0          4
ff be 9e ca ab 67 d5 49 cb 6e 1f 6e 30 fc be          3
ff be 9c 0f 86 0d de 75 7b 10 1b 54 78 ef            2
02 67 be 82 eb d2 44 24 d2 97 a2 a0 f7 61 54 d0       1
ed d9 1e 8c 19 a9 1c 6e 15 58 27 5c be 15 6f e9   ← from bit plane 0
```

PREPROCESSING MULTIPLE BIT PER PIXEL SAMPLED DATA FOR LEMPEL-ZIV COMPRESSION

CROSS-REFERENCE TO RELATED APPLICATIONS

The invention in the present application is related to the subject matter in U.S. Pat. No. 5,612,693, issued Mar. 16, 1997 and U.S. patent application Ser. No. 08/409,766, filed Mar. 23, 1995. Both of the identified applications are assigned to the assignee of the present application.

FIELD OF THE INVENTION

The present invention relates generally to systems and methods for compressing data. More particularly, the invention is directed to systems and methods for preprocessing sampled digital data to more efficiently implement sliding window type lossless Lempel-Ziv data compression.

BACKGROUND OF THE INVENTION

A tremendous need exists for systems and methods which can lossless compress sampled digital data. An application to which the present invention pertains involves the lossless compression of grey scale or color data of video images, such as exists in medical imaging applications.

High definition digital video images with multiple bits per sampled pixel require the lossless compression of data representing millions of pixels at data rates in the range of tens of megabytes per second for compression and decompression. Though lossless sliding window Lempel-Ziv algorithms have been implemented in hardware with sufficient throughput rates, the compression ratios of multiple bit per sampled pixel position data has been relatively poor. In part, this is attributable to the fact that as the quantization precision (in bits per sample) increases, so too does the likelihood that successively adjacent pixels will differ in the least significant bit positions of the digital data. Though preprocessing techniques have been developed, such as that described in the aforementioned co-pending U.S. patent application Ser. No. 08/409,766, the techniques presume a relatively low precision in the data samples and therefore a corresponding consistency of the sampled data in adjacent regions along a scan line. As the bit count per sampled pixel position increases, as with high definition grey scale or RGB format color images, the consistency of the data from pixel-to-pixel decreases dramatically.

Though sampled image data contains a great deal of information redundancy it does not compress well with a direct application of the Lempel-Ziv algorithm. Lempel-Ziv sliding window data compression achieves compression by finding identical matching strings of bytes in an input data stream. In sampled image data, a pixel is represented by an intensity value, or a RGB color content value, captured by digital to analog conversion. A typical high definition video image will have 16 bits per grey scale pixel or 24 bits per color pixel. Although large sections of the image may appear of the same intensity in casual observation, noise variations alone will cause changes in the lower order bits for adjacent pixels. For example for a 16 bit per pixel sample representing a grey scale pixel, noise variation of one part in approximately 65,000 will be sufficient to distinguish successive pixel data.

Grouping pixel data to improve compression is described in U.S. Pat. No. 5,416,857. However, the technique described in the patent does not employ the highly desirable Lempel-Ziv algorithm as first described in the article entitled "A Universal Algorithm for Sequential Data Compression" by authors Lempel and Ziv, in IEEE Transactions on Information Theory, Vol. IT-23, No. 3, pp. 337–343 in 1977. Furthermore, the technique disclosed in the patent involves the processing of the data through a unique circuit in contrast to a preprocessing implementation employing a conventional video graphics system frame buffer.

Therefore, there remains a need for systems and methods which process sampled data into a format particularly amenable to lossless sliding window Lempel-Ziv data compression.

SUMMARY OF THE INVENTION

The present invention defines a system suited to the compression of sampled data, comprising a source of digital format data composed of multiple data bits per sample, means for selecting groups of data bits from successive samples based upon their corresponding bit significance in the samples, means for compressing the groups, and means for transmitting tokens representing the compressed groups. In another form, the invention is directed to a method of compressing sample data, comprising the steps of receiving digital format sampled data composed of multiple data bits per sample, selecting groups of data bits from successive samples based upon their corresponding bit significance in the samples and compressing the groups into an output string of tokens.

In one form, the present invention defines a system and method of preprocessing multiple bit per pixel sampled data for lossless Lempel-Ziv compression whereby data stored in a frame buffer is transposed from a pixel based format to a bit plane based format before compression. Regrouping of the sampled video data from groups and strings referenced by pixel to groups and strings by bit plane materially improves the compressibility of the data by segregating the more significant bits and the least significant bits. In this way, the most significant bits, which tend to be consistent across sections of the image, are highly compressible while the least significant bits, which are acknowledged to be influenced by noise and therefore not very compressible, are grouped for lower compression storage. The practice of the invention optimizes the sliding window data compression capabilities of the Lempel-Ziv technique in the context of data which characteristically exhibits patterns of change linked to bit positions by pixel.

Another aspect of the invention relates to its efficient implementation in the context of a video display system frame buffer. In this regard, the invention provides an elegant preprocessing technique whereby the image data as resident in the frame buffer is readily extracted by bit plane for grouping into strings peculiarly suited to the capabilities of Lempel-Ziv data compression.

These and other features of the invention will be more fully understood and appreciated upon considering the description of the detailed embodiment set forth hereinafter.

BRIEF DESCRIPTION OF THE DRAWINGS

FIG. 4 is a schematic diagram depicting intensity sampling.

FIGS. 5 and 6 graphically illustrate examples of data transposition.

FIG. 8 presents the original and transposed data from a first scan line in FIG. 7.

FIG. 9 presents the original and transposed data from a second scan line in FIG. 7.

DESCRIPTION OF THE PREFERRED EMBODIMENT

The benefits of Lempel-Ziv sliding window data compression have been known for many years. The algorithm defined by Lempel-Ziv provides a highly efficient technique for compressing data having repetitive patterns. Hardware implementations of lossless Lempel-Ziv compression have proven capable of matching the data rates of high resolution grey scale video systems. Unfortunately, as noted hereinbefore, the noise variations which routinely occur in the lower order bits of high precision grey scale images, or high color definition RGB systems, lead to a very poor compression ratios even when the fundamental image content is relatively limited. The poor compression performance is attributable to the noise like variation of the values in the lower order bits.

Given the low compression performance of direct lossless Lempel-Ziv data compression as applied to high definition sampled or video data, the present invention contemplates the inclusion of a preprocessor in a form and method which transposes bits representing the data into a format significantly more amenable to Lempel-Ziv sliding window data compression. The key to the present preprocessor is to transpose the data bits representing the individual sampled pixels so that the higher order bits are grouped together as distinct from the similarly grouped lower order bits. This is in contrast to grouping the bits by sampled pixel position. Investigation has confirmed that such transposition allows the higher order bits, which are in most images characterized with relatively consistent values, to be more compressible. The lower order bits are also grouped, but are in a form which is materially less compressible on an average. However, since the poorly compressible lower order bits previously affected the compressibility of the composite data representing the image by pixel, the transposition materially improves the compressibility of the composite image.

The benefits of such transposition preprocessing for Lempel-Ziv compression are particularly apparent with slowly and continuously varying image. In such images, the higher order bits tend to remain constant over long spans while the lower order bits change in relation to the image variation and noise effects. Thereby, the variations introduced by the lower order bits are isolated so as to allow tremendous compression of data bits strings formed from a succession of the higher order bits.

Figure 1:
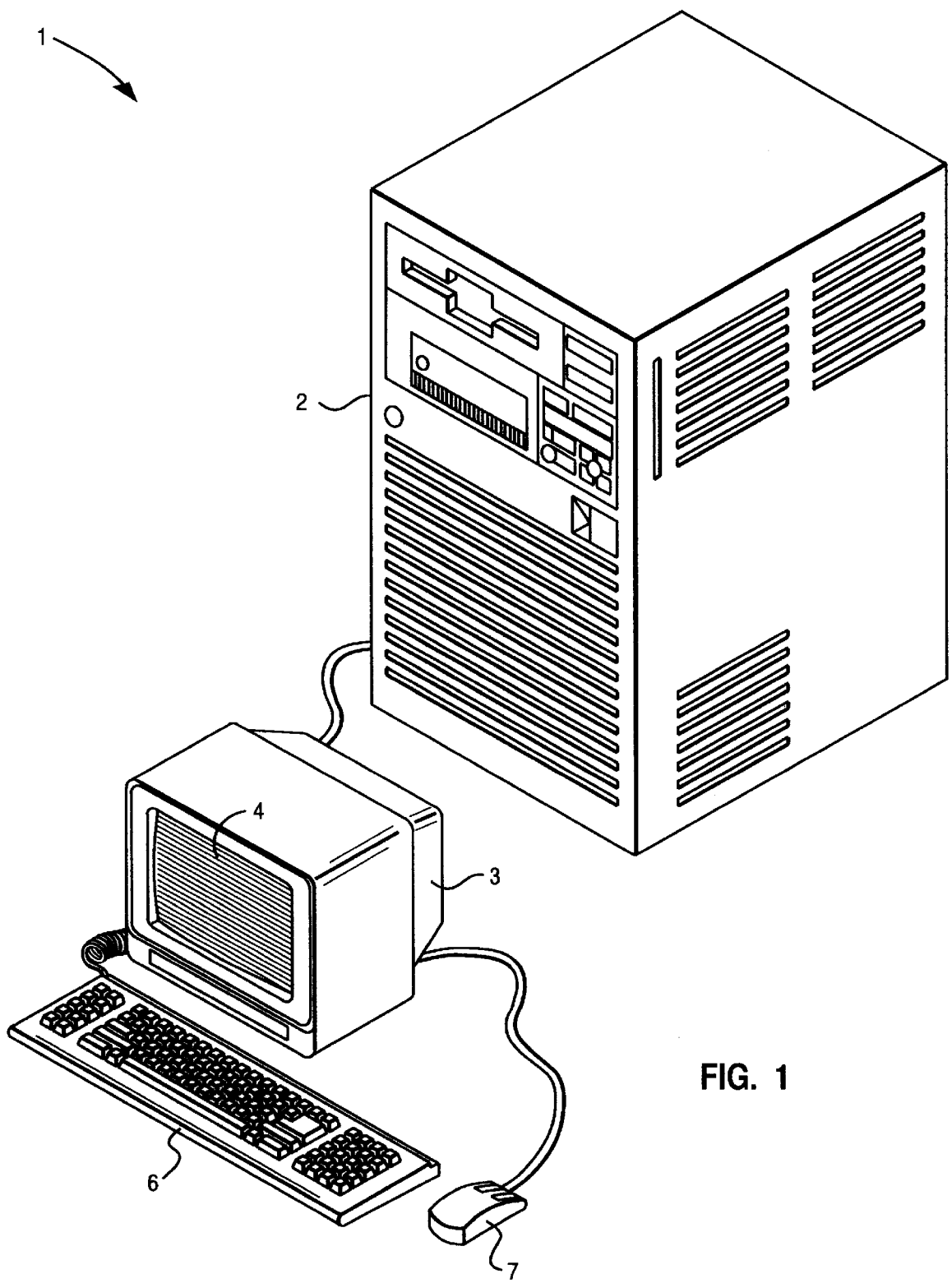
FIG. 1 is a schematic depiction of a graphics workstation.
Figure 2:
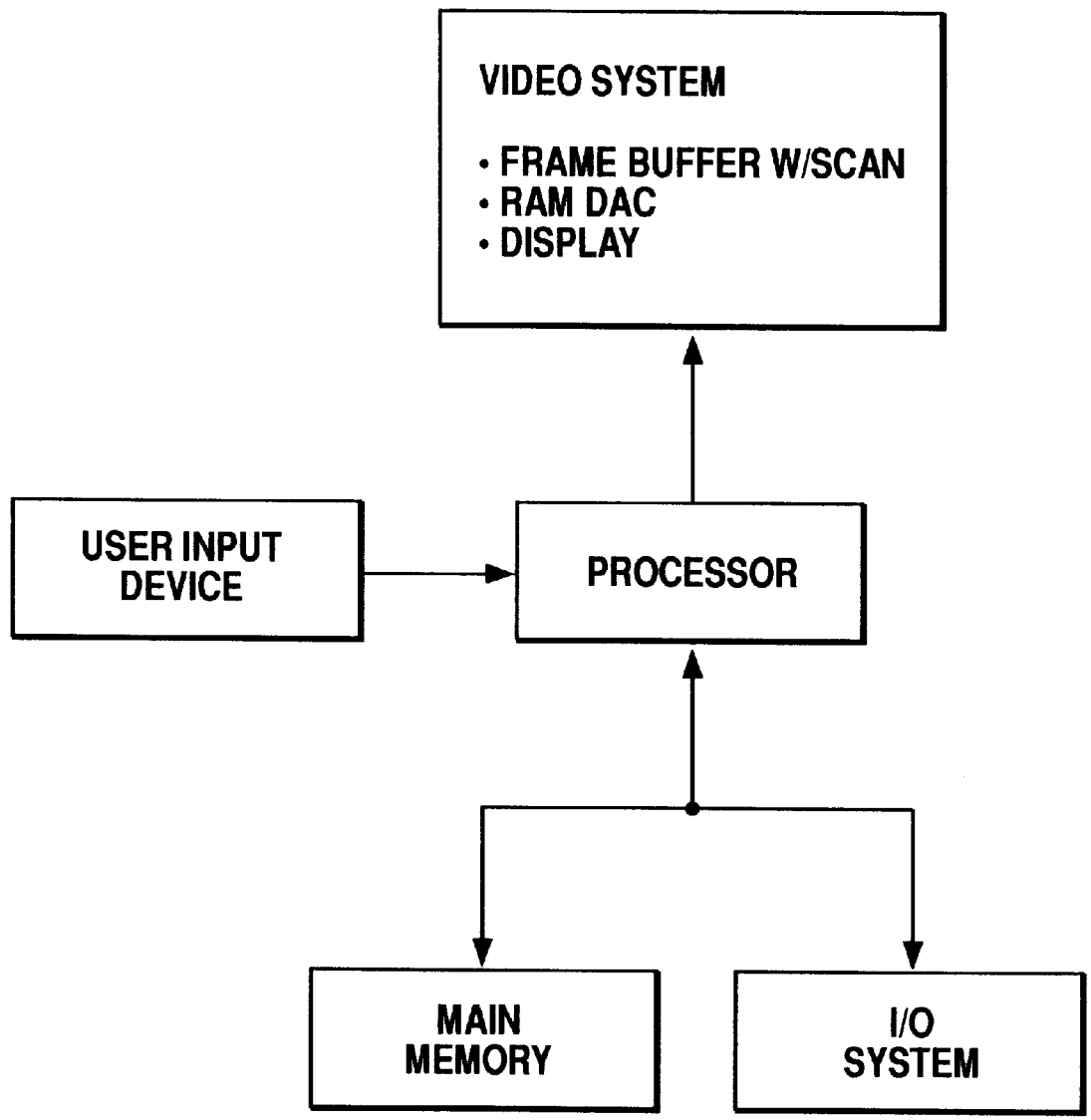
FIG. 2 is a schematic functional block diagram of a graphics workstation.

The present invention is preferably practiced in the context of a personal computer or workstation, such as 1 in FIG. 1, composed of a cabinet, 2 enclosing the processor and volatile and nonvolatile memory, a video display 3 having a raster scanned grey scale or RGB display screen 4, interactively manipulated through a keyboard 6 or mouse 7. FIG. 2 schematically depicts by functional block diagram the general architecture of workstation 1 shown in FIG. 1.

Figure 3:
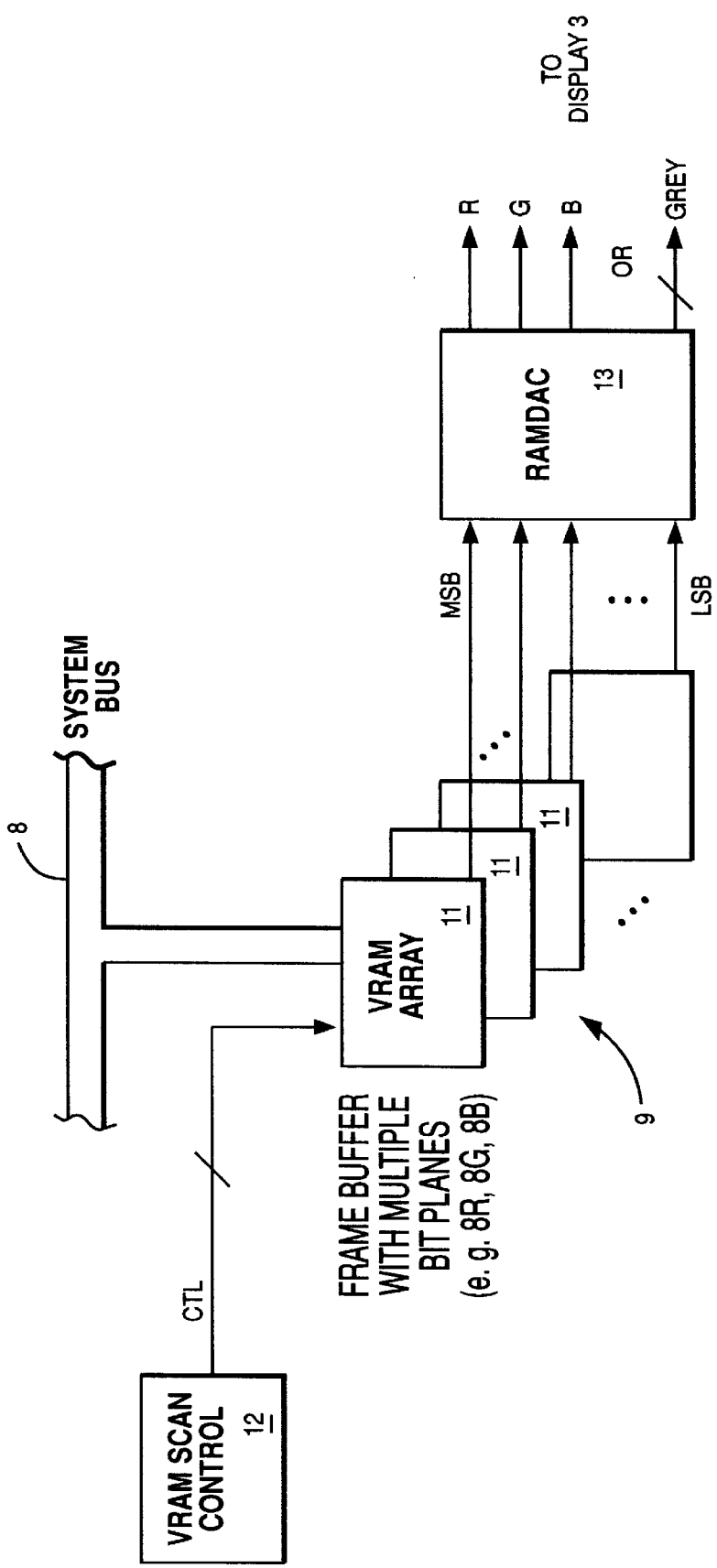
FIG. 3 is a schematic of a prior art frame buffer related graphics display subsystem.

FIG. 3 schematically depicts by functional block diagram the architecture of a conventional frame buffer implemented RGB or grey scale video drive system, such as would be used to control display 3 in FIG. 1. In this context, the processor generates graphical images on a pixel basis and provides the data for the individual pixels over system bus 8 to VRAM array configured frame buffer memory 9. The individual bit planes 11 of the frame buffer store the individual bit information by pixel position from a most significant bit (MSB) plane to a least significant bit (LSB) plane. Typical high resolution color graphics system use 24 bit planes, individually representing 8 red, and 8 green and 8 blue bits. If only grey scale information is to be stored in frame buffer 9, typically the frame buffer will only have 16 bit planes. The number of bit planes is important to the present invention only that it defines the precision of the data for the pixels, whereby the larger number is more likely to be susceptible to noise variations and as a consequence less compressible by direct Lempel-Ziv compression.

As illustrated in FIG. 3, and well known in the art, the image generated by the processor and loaded into frame buffer 9 is selectively scanned by VRAM scan control 12 to provide by pixel position a succession of multi-bit data representing each pixel's appearance to RAMDAC 13. In the context of a color system, RAMDAC 13 converts the digital frame buffer bit plane data into analog RGB signals. On the other hand for grey scale frame buffer data, the output is an analog grey scale value for each pixel position as that position in the memory is scanned.

Although the invention will be described in the context of compressing image data as stored in a workstation frame buffer, the fundamental concept is applicable to any successively sampled data subject to noise or pattern variations which affect the least significant bits while the most significant bits remain relatively consistent. See FIG. 4. For the intensity samples at time $t_1$ and $t_2$, note that the raw digital data differs only by a single bit in the least significant bit position. However, when such successive data is subject to compression by lossless sliding window Lempel-Ziv algorithm, random lower order bit variations materially degrade the compression.

Figures 4, 5:
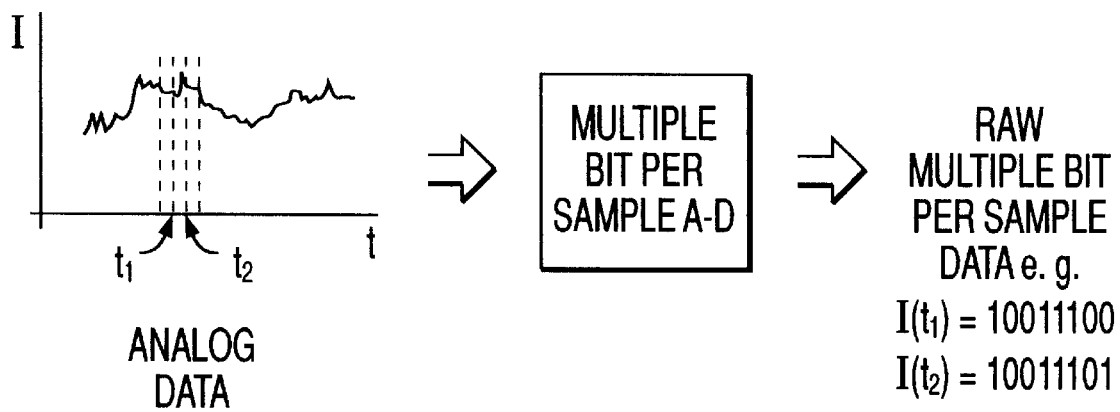

FIG. 5 provides an example of preprocessing according to the present invention as applied to sampled digital data. The original string represents 8 successive pixels, with an 8 bit string representing each such pixel. For example, the first pixel data is hex 96, the second is hex 90, the third is hex 97, the fourth is hex 9c, the fifth is hex 9c, the sixth is hex 8d, the seventh is hex 8b and the eighth is hex 89. The corresponding bits for each pixel, which match the hex numbers, are shown in column format directly below beginning with the least significant bit at the bottom and progressing toward the most significant bit at the top. In this regard, for the fifth pixel, having hex value 9c, the binary string from least significant bit to most significant bit is 00111001.

Transposition according to the present invention is done by bit planes, where the first bit plane, representing the most significant bits of the eight pixels, is composed of all 1s and therefore represented by the hex value ff. The next 2 bit planes are composed of all 0s, therefore they are represented by hex values 00. The least significant bit plane, which is the most susceptible to noise for each of the pixel positions, is represented by the hex value 27 for the 8 pixels. The transposed output as shown at the bottom of FIG. 5 is composed of ff, 00, 00, f8, 1f, bc, a2 and 27. The simple example in FIG. 5 is insufficient in size to illustrate compression improvement but does illustrate the underlying concept of transposition according to the present invention from column referenced bit strings to row referenced bit strings.

The second example as depicted in FIG. 6 increases the number of 8 bit pixels to a total count of 16. The transposed result is set forth at the bottom of the illustration, showing at least two distinct patterns suited to Lempel-Ziv compression, namely the hex ff and hex 00 values. In contrast, an examination of the original values clearly indicates the absence of Lempel-Ziv compressible patterns.

Figure 7:
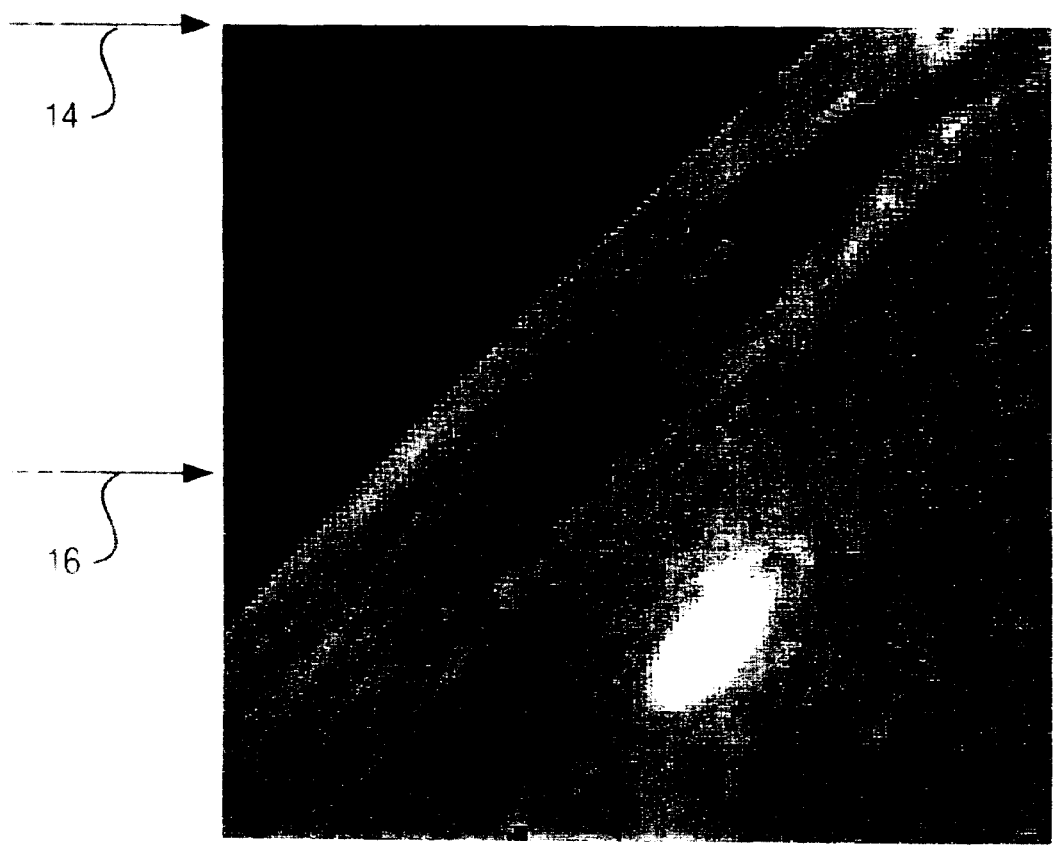
FIG. 7 illustrates an image and related scan line locations.

FIG. 7 illustrates the implication of the preprocessor as applied to a real world scientific image data composed of 128 pixel rows. A comparison of the transposed data to the original data, for the scan line identified at 14 in FIG. 7, demonstrates that longer runs of identical bytes are produced in the transposed format.

A similar showing appears in FIG. 9 where the data represents scan line 16 in FIG. 7. Because scan line 16 extends through a portion of the image which is other than generally "black" the variations from pixel-to-pixel are significantly more pronounced in the original data. In such case, the compressibility of the original data decreases significantly with conventional lossless Lempel-Ziv. Though a decrease in compressibility is also apparent from an examination of the transposed data in FIG. 9, the transposed data in FIG. 9 does nevertheless include significant portions of materially compressible data, portions significantly greater than that represented by the original data.

Figure 10:
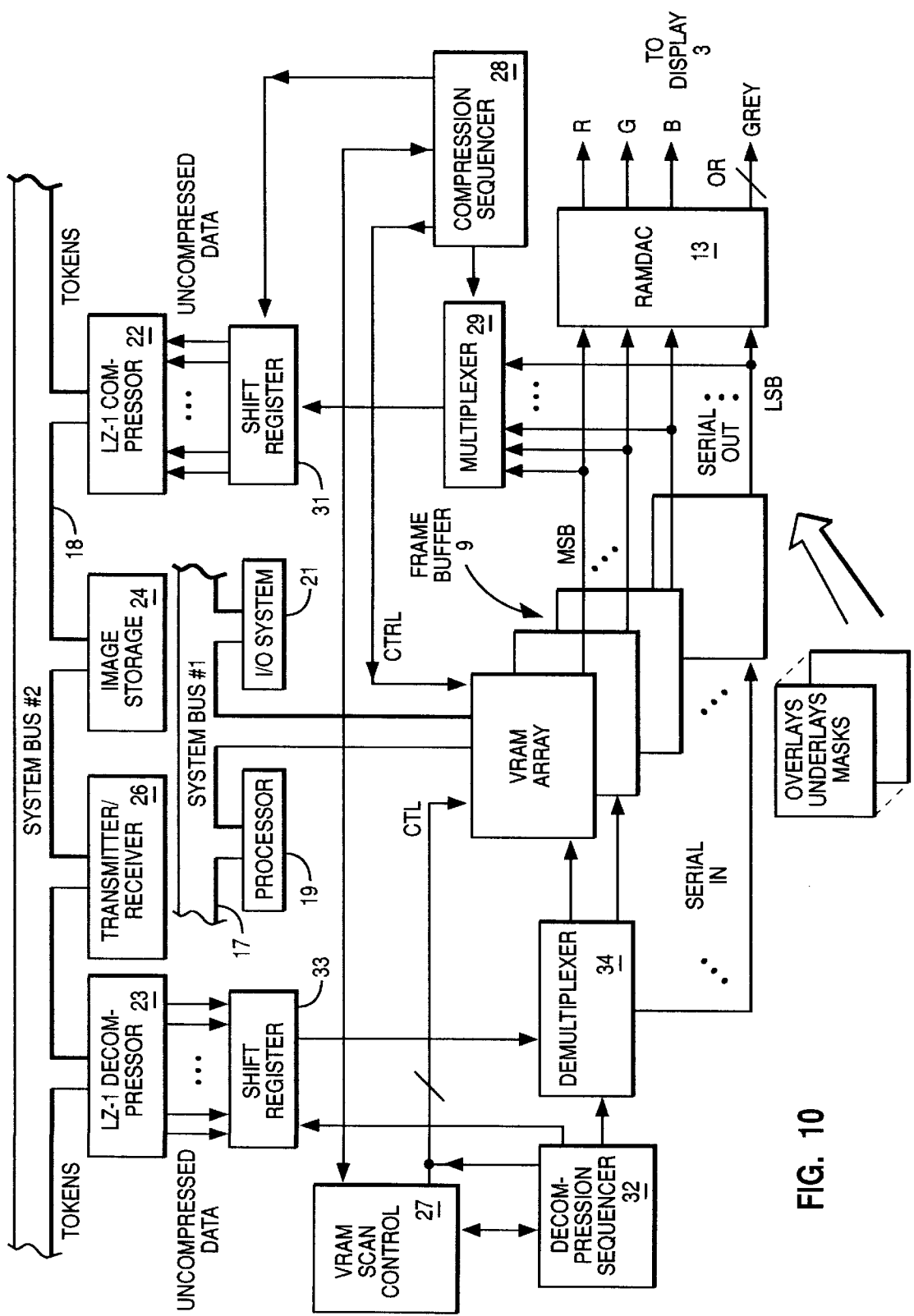
FIG. 10 schematically depicts by functional blocks embodiments of the invention in the context of a graphics display subsystem for a workstation.

FIG. 10 schematically illustrates by functional block diagram an implementation of the preprocessor as applied to the architecture of a workstation to provide high rate lossless Lempel-Ziv data compression and decompression capability. It should be understood that the implementation of a preprocessor is not limited to video image data of the form to which the workstation in FIG. 10 pertains, but applies to any sampled digital format data which is composed of a succession of bit strings which are spatially or temporally related. The compression improvement provided by the preprocessor is particularly pronounced when the succession of samples are taken from a population which is "relatively" consistent in value over an extended range, such as successive samples distinguished noise influences.

The workstation architecture in FIG. 10 contemplates the use of two system busses, identified by reference numerals 17 and 18. System bus 17 is the conventional which connects frame buffer 9 to processor 19 as well as input/output system 21. Multiple bit per pixel video image data generated by in processor 19 or received from I/O system 21 is transmitted over system bus 17 for storage in, and subsequent scanning from, frame buffer 9. It should be apparent that processor 9 can be the main processor of the workstation or could be a dedicated graphics processor. In the latter case, where processor 19 is a graphics processor, I/O system 21 is more likely to be an interface to another bus than to actual input/output peripherals of the workstation itself.

The second system bus 18 depicted in the embodiment of FIG. 10 conveys the video image data in compressed token format. The tokens are generated in Lempel-Ziv 1 compressor 22 and decompressed in Lempel-Ziv 1 decompressor 23. Since a variety of Lempel-Ziv 1 compressors and decompressors are known in the industry, and the invention is directed to the preprocessing function, the choice of the exact compressor/decompressor implementation is left to the discretion of the designer.

As illustrated in the embodiment of FIG. 10, the Lempel-Ziv tokens transmitted on bus 18 may be subject to storage in image storage block 24 or to further transmission through transmitter/receiver block 26. Since bus 18 is connected to decompressor 23, compressed data may also be received in block 26 and conveyed over bus 18 to decompressor 23 for eventual transfer to frame buffer 9 and depiction on display 3 (FIG. 1). As such, the workstation becomes a video receiver which is responsive to compressed format video data.

The two aspects of the preprocessor will be described individually, first from the perspective of preprocessing a multiple bit per pixel image in preparation for Lempel-Ziv compression, and then from the perspective of reconstructing the image following Lempel-Ziv decompression.

First, consider preprocessing for compression. VRAM scan control 27 in conjunction with compression sequencer 28 scans the content of frame buffer 9 one bit plane at a time to extract the image data. The selection of the bit plane is accomplished by multiplexor 29. The bit plane data is read out in serial format into shift register 31 for a serial to parallel conversion. The uncompressed data from shift register 31 is presented by groups of data bits to the Lempel-Ziv compressor 22.

Using the simplified example in FIG. 6, where frame buffer 9 is now presumed to have 8 bit planes, a serial reading of the most significant bit plane provides a serial string of is to shift register 31. If shift register 31 is configured to create byte size groups, then for the example most significant bit plane of FIG. 6 the uncompressed data presented to Lempel-Ziv compressor 22 would be comprised of a first hex sequence ff followed by a next hex sequence of ff. Continuing with the example in FIG. 6 as applied to the next most significant bit plane, the transposed but uncompressed data presented to Lempel-Ziv compressor 22 by the preprocessing system would consist of two successive groups having hex values 00. As described earlier in the context of compressing sampled data, data transposed into this format by preprocessing is amenable to significantly better lossless Lempel-Ziv compression.

The scanning and compression of the frame buffer image data is completed bit plane by bit plane until the least significant bit plane is processed. For an RGB system the operation is on a color basis. As the frame buffer data is preprocessed and compressed, the output in the form of tokens is generated on system bus 18.

The complementing operation of decompressing received tokens into video image data for frame buffer 9 is performed by the decompression section of the preprocessor. Decompression processing is accomplished through the interaction of VRAM scan control 27 with decompression sequencer 32, shift register 33 and the multiplexor 34. In operation, tokens on system bus 18 are decompressed by Lempel-Ziv decompressor 23. The uncompressed data is presented as groups of parallel format data bits to shift register 33. Shift register 33 and the multiplexor 34 convert the parallel format groups of data bits into bit serial format and select the appropriate bit plane of frame buffer 9.

In a preferred implementation of the preprocessor, shift registers 31 and 33 are of byte size, so that the individual bits in each bit plane are grouped into byte size units for compressor 22. Other bit lengths can obviously be used for the grouping. However, preliminary indications are that byte size groups provide a good balance for grey scale images.

Note that preprocessing system of the present invention is particularly compatible with conventional video display systems in which the image data is stored one or more VRAM frame buffers configured with multiple bit planes. The present invention interacts with these individually defined bit planes to efficiently implement preprocessing for compression and decompression. It should also be noted that the compression of data in the bit planes of video display systems encompassed data representing overlays, underlays and mask patterns. Such bit planes are amenable to preprocessing and compression in an analogous manner and may benefit greatly because their patterns are often stored and reused in the course of real time animation performed on the workstations.

Though the invention has been described and illustrated by way of specific embodiments, the systems and methods encompassed by the invention should be interpreted in keeping with the breadth of the claims set forth hereinafter.

What is claimed is:

1. A system suited to the compression of video data, comprising:
   a frame buffer means with multiple bit planes for storing digital format video data composed of multiple data bits per pixel;
   means for serially reading the video data from a selected bit plane of the frame buffer means;
   means for forming the serially read video data into groups;
   means for transmitting formed groups in ordered succession;
   means for compressing the video data as represented in the ordered succession of groups; and
   means for transmitting token s representing the ordered succession of groups in compressed form.

2. The system recited in claim 1, further comprising:
   means for receiving transmitted tokens;
   means for decompressing the received tokens into groups and;
   means for serially transmitting video data from successive groups; and
   means for selecting a bit plane into which the serial format video data is to be written.

3. The system recited in claim 2, wherein the means for serially reading is a multiplexer and the means for forming the serially read video data into groups is a shift register.

4. The system recited in claim 3, wherein the means for compressing utilizes Lempel-Ziv compression.

5. The system recited in claim 4, wherein digital format video data stored in the frame buffer means provides RGB color bits by pixel.

6. A method of compressing video data, comprising the steps of:
   storing digital format video data composed of multiple data bits per pixel in a frame buffer using multiple bit planes;
   serially reading the video data from a selected bit plane of the frame buffer;
   forming the serially read video data into groups;
   transmitting formed groups in ordered succession; and
   compressing the video data as represented in the ordered succession of groups into an output string of tokens representing multiple groups in compressed form.

7. The method recited in claim 6, comprising the further steps of:
   receiving a string of tokens;
   decompressing the tokens into groups;
   serially transmitting video data from successive groups; and
   selecting a bit plane into which the serial format video data is to be written.

8. The method recited in claim 7, wherein the serial reading is performed by a multiplexer and the forming of the serially read data into groups is performed by a shift register.

9. The method recited in claim 8, wherein the compressing step is performed within a Lempel-Ziv compressor.

10. The method recited in claim 9, wherein the digital format video data is composed of RGB color bits by pixel.

* * * * *